No. 620,381. Patented Feb. 28, 1899.
W. C. TROWNSELL & J. R. TREGO.
ATTACHMENT FOR LINOTYPE MACHINES.
(Application filed Jan. 21, 1897.)

(No Model.) 4 Sheets—Sheet 1.

WITNESSES:
Harry S. Rohrer
John J. Keating

INVENTORS:
William C. Trownsell
Joseph R. Trego
BY
W. A. Redmond
ATTORNEY.

No. 620,381. Patented Feb. 28, 1899.
W. C. TROWNSELL & J. R. TREGO.
ATTACHMENT FOR LINOTYPE MACHINES.
(Application filed Jan. 21, 1897.)
(No Model.) 4 Sheets—Sheet 2.
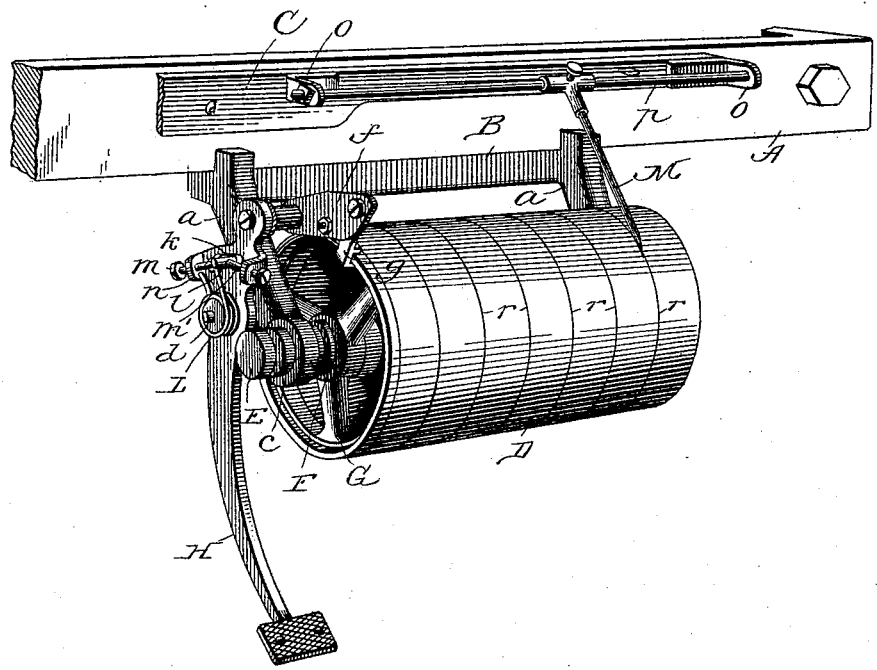
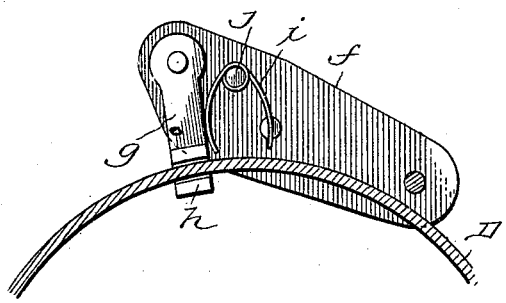
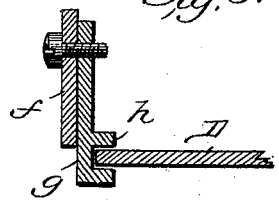
WITNESSES:
INVENTORS:

No. 620,381. Patented Feb. 28, 1899.
W. C. TROWNSELL & J. R. TREGO.
ATTACHMENT FOR LINOTYPE MACHINES.
(Application filed Jan. 21, 1897.)

(No Model.) 4 Sheets—Sheet 3.

WITNESSES:
Harry S. Rohm
John J. Keating

INVENTORS:
William C. Trownsell
Joseph R. Trego
BY W. A. Redmond
ATTORNEY.

No. 620,381. Patented Feb. 28, 1899.
W. C. TROWNSELL & J. R. TREGO.
ATTACHMENT FOR LINOTYPE MACHINES.
(Application filed Jan. 21, 1897.)
(No Model.) 4 Sheets—Sheet 4.
Fig. 8.
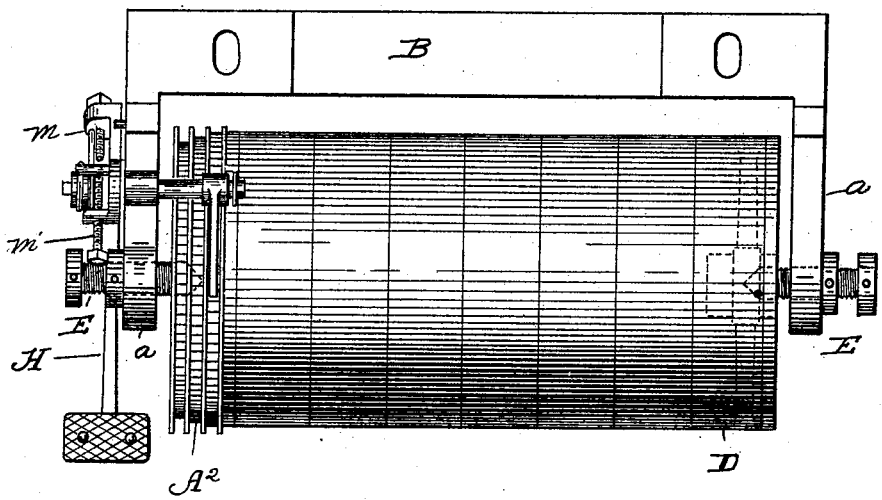
Fig. 9.
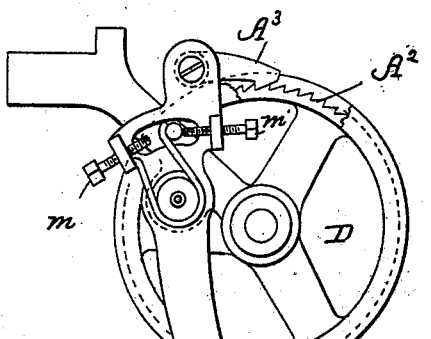
Fig. 10. Fig. 11.
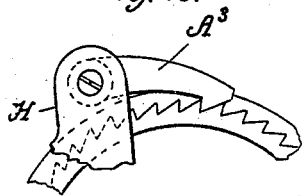
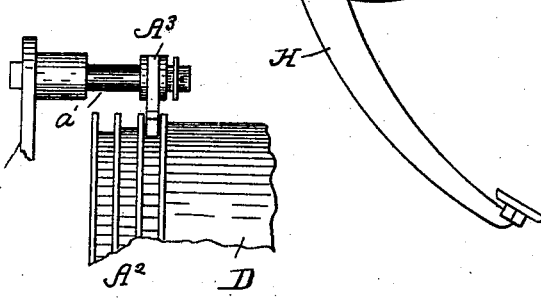
Witnesses
Victor J. Evans
Frank Montgomery
Inventors.
William C. Trownsell
Joseph R. Trego
by W. A. Redmond, Atty.

UNITED STATES PATENT OFFICE.

WILLIAM C. TROWNSELL AND JOSEPH R. TREGO, OF SAN FRANCISCO, CALIFORNIA.

ATTACHMENT FOR LINOTYPE-MACHINES.

SPECIFICATION forming part of Letters Patent No. 620,381, dated February 28, 1899.

Application filed January 21, 1897. Serial No. 620,106. (No model.)

*To all whom it may concern:*

Be it known that we, WILLIAM C. TROWNSELL and JOSEPH R. TREGO, citizens of the United States, residing at San Francisco, in the county of San Francisco and State of California, have invented certain new and useful Improvements in Attachments for Linotype-Machines; and we do hereby declare the following to be a full, clear, and exact description of the invention, such as will enable others skilled in the art to which it appertains to make and use the same.

This invention relates generally to a machine for producing what are known in the art as "linotypes," and particularly to an attachment for such machine for indicating to the operator the exact length of the line of matrices and spaces as they are being assembled in the order in which they are to appear in print; and it has for its object to provide a simple, durable, and inexpensive device adapted to be easily and readily attached to the machine in position to be operated thereby at each movement of the finger-keys, so as to disclose to the operator the exact length of the line of matrices and spaces after each addition to said line of a matrix or space; and it consists of the parts and combination of parts hereinafter described and claimed.

Figure 1:
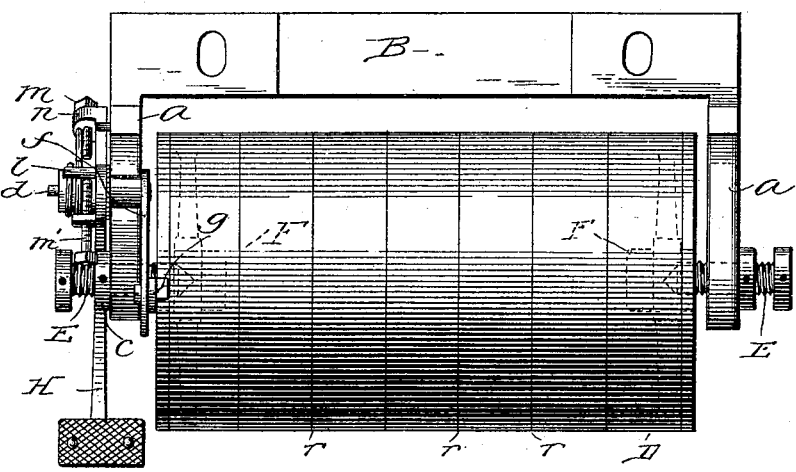
Figure 2:
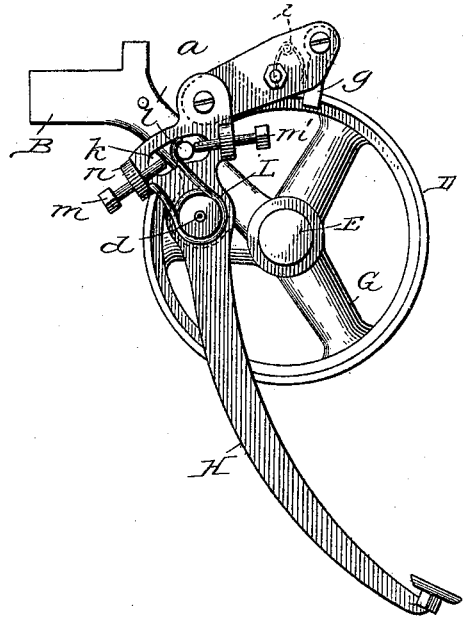
Figure 6:
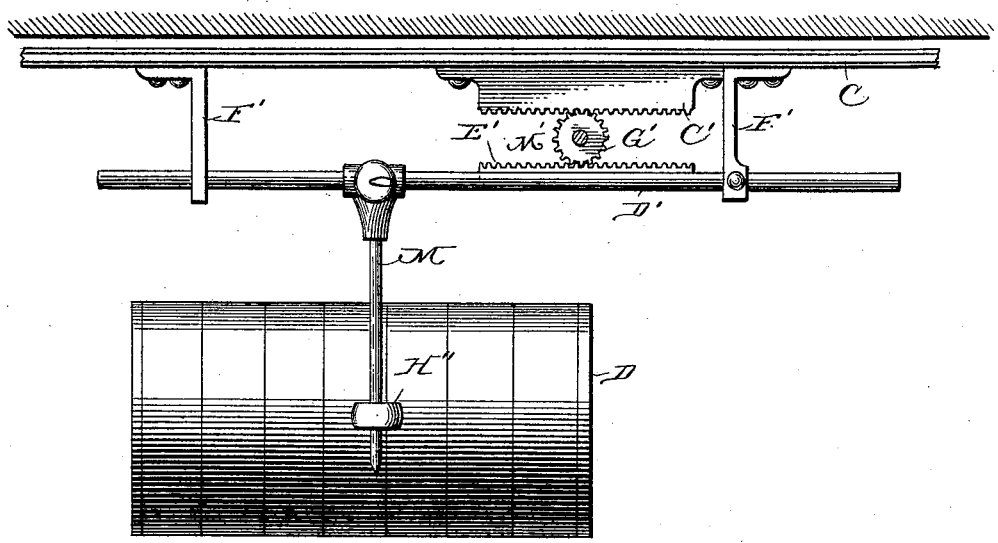
Figure 7:
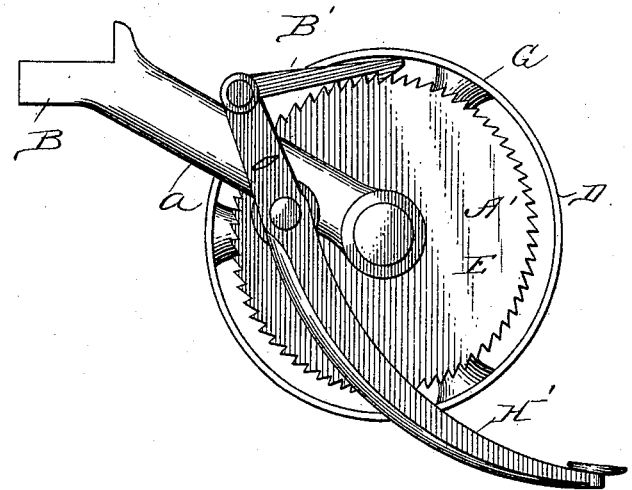

In the accompanying drawings, forming a part of this specification, Figure 1 is a plan view of our device; Fig. 2, an end view; Fig. 3, a perspective view showing our invention attached to the front cross-bar of the frame of a linotype-machine; Fig. 4, a detail view of cylinder-gripping device; Fig. 5, a detail view in section of the grip-lever; Fig. 6, a plan view of a modification of the mechanism for moving the pointer; Fig. 7, a modified form of operating the cylinder or drum; Fig. 8 is a plan view of a modified form of a device for varying the space between lines. Fig. 9, an end view; Fig. 10, an enlarged detail end view showing the pawl and a portion of one of the ratchet-wheels, and Fig. 11 a detail front view of the same.

As our invention relates solely to an attachment for linotype-machines of that type shown in the United States patent to O. Mergenthaler, No. 436,532, dated September 16, 1890, only such parts of such a machine will be described as coöperate with our invention or tend to render the operation of our invention clear.

Referring to the drawings, A represents a part of the main frame of a linotype-machine, and B a bracket attached thereto, by which our attachment is connected to and supported from said main frame over or above the keyboard of the machine and below the horizontal yielding resistant C. Between the arms *a* of the bracket B a cylinder or drum D is supported by means of conical pointed screws E, passing through the ends of the arms *a* and into a conical recess in a hardened block F, (indicated by dotted lines, Fig. 1,) arranged in the spider G at each end of the cylinder or drum. The screws E are secured in place by jam-nuts *c*, so as to prevent movement and to permit of ready adjustment of said screws when necessary.

H represents a finger-lever pivotally mounted at its upper end on a stud *d*, projecting from one of the arms *a* of the bracket B, the short arm of said lever being pivotally connected by a link *f* to a grip-lever *g*. The grip-lever *g* is formed with a thickened or enlarged free end, in which a slot *h* is formed, which is adapted to slip onto the edge or rim of the cylinder or drum D, with which it is normally held in engagement by means of a spring *i*, one end of which is secured to the link *f* and the other end, after being bent over a post *j*, bearing against the lever *g*, so that its tendency is to throw the end of lever *g* outwardly at all times. A slot *k* is formed in the lever H above its pivotal point, through which projects a short post *l* from the arm of bracket B, and at each end of said slot set-screws *m m'* are arranged, so as to engage said post *l*, and thus limit the throw of the lever H. The post *l* also serves the purpose of a retaining-post for one end of a spiral spring L, which is arranged around the fulcrum of finger-lever H and has its other end engaging a projection *n* on said lever. The limit of movement of the lever H is controlled by the set-screws *m m'*, and the spring L operates to return the key or finger lever to its normal position after it has been depressed by the operator and released.

From the above description it will be understood that the depression of the finger or key lever H causes the grip-lever g to slide or slip along the rim or flange of the cylinder, and upon release of said lever H the spiral spring L returns it to its normal position and causes the grip-lever g to grip or engage the rim or flange of the cylinder and to revolve said cylinder till the set-screw m' engages the post l. Thus it will be observed that the set-screws m m' may be adjusted to limit the movement of the lever, so as to permit of a short or long throw of the same, and that the movement of the cylinder is thereby made shorter or longer, according to the set or adjustment of said screws, for a purpose which will be hereinafter described.

To the assembling-bar C of the linotype-machine two lugs or perforated ears o are secured, in which are secured the ends of a rod p. On the rod p a pointer M is adjustably secured by a thumb-screw or in any other convenient manner, which extends downwardly to the cylinder or drum D. The yielding resistant C may be operated by the means now commonly used for that purpose or in any suitable or desired manner and carries with it the pointer M in its movement across the machine, said pointer moving a space equal to the width of the matrix delivered at each movement of the finger keys or levers and is thus progressively carried across the drum from end to end or a distance equal to the length of the linotype the machine is casting.

The cylinder or drum has formed around its circumference a series of lines r, indicating the dividing-lines between columns, as in a newspaper.

Although our invention is adapted for use in setting reprint or any odd measure, it is specially useful in setting matter around a face or bust or any irregular cut, so as to bring the reading matter to the margin of the cut without leaving any blank corners. As an instance of this use of our invention take an article which is to be three columns in width and to surround a cut. The operator lays the cut on a sheet of paper and draws a line around its margin, so as to outline its exact shape. He then cuts this shape out and fastens it in any desired manner, as by paste, reverse side up on the cylinder or drum and in the center of the space covered by the four lines r, representing three columns. As the pointer M moves from right to left it is adjusted and secured on rod p, so that its end rests on or immediately over the right-hand line r. The operator then proceeds to assemble a line, and the pointer moves to the left or toward the silhouette until it reaches it, from which point the operator finishes out the line with quads or spaces. Before assembling the next line of matter, which may be longer or shorter, the operator depresses the finger key or lever H, thus imparting a partial revolution to the cylinder D, which carries it the distance the lines are to be printed apart, and thus moves the silhouette to the position it will occupy relative the line next to be assembled.

Usually in articles such as described the first and last few lines are longer than full measure or longer than the slug or bar the machine is casting. In this case the pointer is placed at the second column from the right, the first line assembled regardless of pointer, and the next set up to cut, as above described. The foregoing describes the setting up of the matter which is to the left when printed; but the operation of our invention is the same in setting up the other side, the only difference being that the pointer is placed in the center of the cut at the start and the quads or spaces set up till the pointer reaches the edge of the cut or silhouette, and then the setting up of the reading matter follows.

In Fig. 7 is illustrated a modified form of our invention, in which A' represents a ratchet-wheel rigidly mounted on the cylinder-shaft, which extends beyond its bearings in the arms of the bracket, and B' a pawl connected to the finger key or lever H', so as to engage and move the ratchet-wheel and cylinder the necessary distance each time a new line is to be assembled, the pitch of the teeth of the ratchet-wheel being equal to the thickness of the linotype; also, it is evident that the parts may be reversed and the pawl mounted on the cylinder and the ratchet-wheel on the lever and the same result obtained; also, we may use a number of ratchet-wheels having teeth of different pitch, with a pawl or pawls for engaging the same where a variation of space between lines is desired, as shown in Figs. 8, 9, 10, and 11, in which $A^2$ represents a series of ratchet-wheels having teeth of different pitch securely attached to one end of the cylinder D. $A^3$ represents a pawl mounted on a stud a', carried by the short arm of lever H and adapted to be adjusted laterally on said shaft, so as to engage either of the ratchet-wheels $A^2$. In operation the screws m m' are set or adjusted to give the pawl the exact amount of travel when it is adjusted to engage the ratchet-wheel whose teeth have the greatest pitch. Then upon pressing the lever H the pawl will be moved ahead a distance equal to one tooth and engage the same, and in returning, upon release of the pressure on the lever, will move or rotate the cylinder the exact distance necessary to the space required for the type corresponding to the pitch of the teeth of said ratchet. When it is desired to use smaller type, the pawl is adjusted on the stud a', so as to engage the ratchet-wheel having teeth the pitch of which corresponds to the size of the type it is desired to use. The pawl moves forward the same distance on all of the ratchet-wheels, but in returning only moves the cylinder the distance corresponding to the pitch of the teeth of the ratchet with which it is in engagement.

In Fig. 6 we show a modified means of attaching and operating the pointer, the object of which is to reverse the direction of movement of the pointer in order to permit of matter being set from left to right on one side of a cut and from right to left on the other side. This is accomplished by attaching to the yielding resistant C a rack C' and to a rod D' a similar rack E', said rod being loosely inserted in and supported by the bracket-arms F', secured to the yielding resistant C. Between the racks C' and E' a pinion G' is arranged so as to engage said racks, said pinion being supported by an axle M', extending from the main frame of the linotype-machine. Thus when the yielding resistant moves to the left during the operation of the machine its rack C' actuates the pinion G', which in turn actuates the rack E' and carries the pointer M, which is secured to rod D', to the right, while a reverse movement is imparted to the pointer through the same mechanism when the yielding resistant is moved to the right. H" represents a friction-roller on pointer M.

Having thus described our invention, what we claim as new, and desire to secure by Letters Patent, is—

1. The combination, with the yielding resistant of a linotype-machine, of a device for indicating the increased length of a line of matrices as each matrix is added thereto, and means for indicating the required length of such lines to fill in around a cut without first measuring said lines.

2. The combination, with a movable yielding resistant of a linotype-machine, of a pointer operated by said bar and a cylinder or drum having a scale or column dividing lines thereon, whereby the length of a line of matrices is indicated as each matrix is added thereto.

3. The combination with the yielding resistant of a linotype-machine, of a pointer operated by said bar, a cylinder or drum having a scale or column dividing lines thereon and means for imparting a partial revolution to said cylinder.

4. The combination, with the yielding resistant of a linotype-machine, of a pointer operated by said bar, a cylinder or drum having column dividing lines thereon, means for imparting a partial revolution to said cylinder or drum, and means for limiting the motion of said drum.

5. The combination, with the yielding resistant of a linotype-machine, of a pointer, and mechanism for imparting motion to said pointer reverse to the direction in which said assembler-bar moves.

In testimony whereof we affix our signatures in presence of two witnesses.

WILLIAM C. TROWNSELL.
JOSEPH R. TREGO.

Witnesses:
LEE D. CRAIG,
L. J. PRINCE.